June 9, 1942.    O. C. H. STURKEN    2,285,758
PROCESS OF CURING ZEIN
Filed April 18, 1938
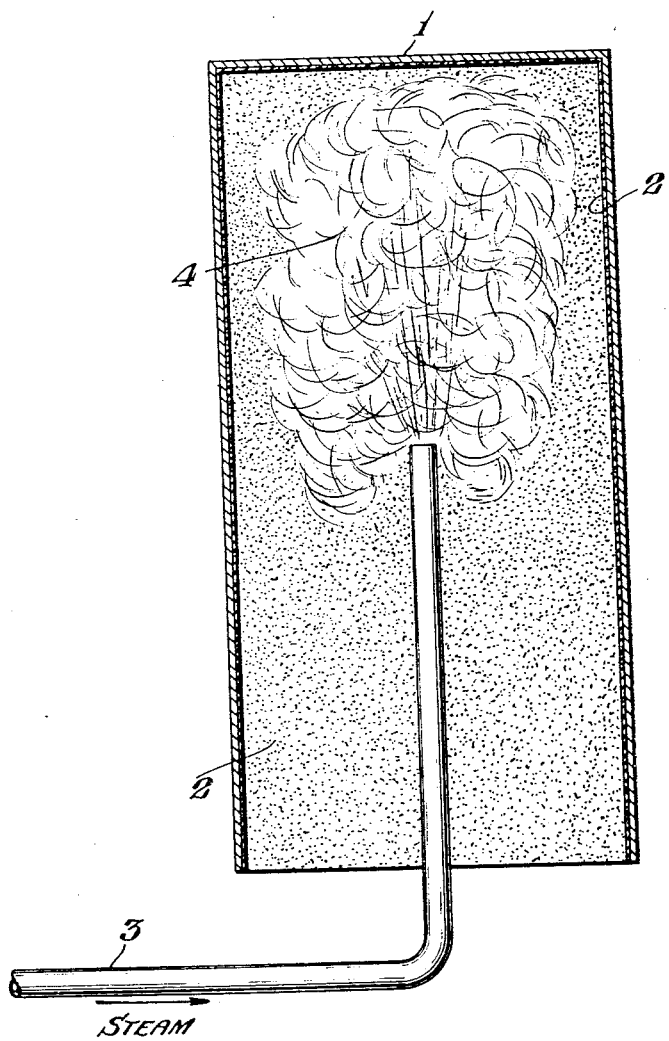
Inventor:
Oswald C. H. Sturken,
by Barnett Truman
Attorneys.

Patented June 9, 1942

2,285,758

UNITED STATES PATENT OFFICE 2,285,758

PROCESS OF CURING ZEIN

Oswald C. H. Sturken, Closter, N. J., assignor, by mesne assignments, to Corn Products Refining Company, New York, N. Y., a corporation of New Jersey Application April 18, 1938, Serial No. 202,675

7 Claims. (Cl. 18—48)

This invention relates to the production of zein bodies, more particularly zein films, either cast or in the form of coatings; and the primary object of the invention is to provide a simple and economical method of treating the zein to make it resistant to water and substantially insoluble in and unaffected by alcohol or other liquids which dissolve or tend to affect the character or appearance of zein solidified from solution.

The invention is based upon the discovery that if a zein film, made for example, by dissolving zein in any of its common solvents and spreading the solution in the form of a thin stratum, is subjected for a brief period to contact with steam at substantially atmospheric pressure, while the film is incompletely dried but after it has ceased to be sticky or tacky to the touch, the zein becomes cured or denatured so that the film without losing its transparent character becomes highly resistant to water, alcohol and other liquids. The temperature of the steam when in contact with the zein film may be, and ordinarily will be, somewhat less than 212° F. Steam at higher temperatures than 212° F. could be used, but without any apparent advantage, and with the disadvantage that the film might be blistered through the formation of bubbles by the evaporation of the solvent. The term "steam at substantially atmospheric pressure" is not to be regarded as limiting the temperature to 212° F., which may vary to some extent both above and below this temperature. The curing operation of the present invention seems to be chemically quite a different operation from formaldehyde curing, for example. A denaturing or insolubilizing of the zein takes place together with the removal of the residual alcoholic solvent. However, if increased hardness and toughness is desired, formaldehyde may be incorporated into the zein solution used for making the film.

The curing process of the present invention has advantages over a common method of curing which consists in heating the film containing formaldehyde or other curing agent at relatively high temperatures for long periods of time, for example, by oven treatment at 230° F. for two hours, more or less. Such procedure is not very practical because of cost and of the risk of impairing the film by over-treatment; and, in some cases, it is entirely impractical because, with some of the coated articles, the articles themselves are likely to be detrimentally affected by the prolonged high temperature.

The zein film to be treated according to the present invention may contain any of the usual plasticizers, lubricants or fillers used in zein plastics.

Any suitable zein solvent or mixture of solvents may be employed for dissolving the zein. Preferably a relatively low boiling point alcohol is used, such as will be vaporized and extracted at the temperature of steam at atmospheric pressure, as for example, methyl alcohol, aqueous ethyl alcohol, or aqueous iso-propyl alcohol.

A zein coating cured in accordance with the present invention is suitable, for example, for lining paper containers or the like, since the lining will be resistant to and substantially unaffected by most liquids.

The invention is illustrated in a preferred embodiment in the accompanying drawing in which 1 designates a carton treated on the inside with a zein film 2 indicated by the shaded parts of the drawing. 3 is a steam pipe which projects into the carton and 4 indicates the steam vapor issuing from the steam pipe.

The following are examples of reduction of the invention to practice. It will be understood that the examples are purely illustrative and informative and are not intended to limit the invention to the particulars given. The intention is to cover all equivalents of the agents specified as well as all modifications of the particularly disclosed processes which are within the scope of the appended claims.

Example 1

A container of fibrous material is lined with a zein-containing film formed from a solution of the following composition:

Zein _____ parts by weight__ 100
Iso-propyl alcohol containing 10% of water _____ parts__ 350
Diethylene glycol (plasticizing agent) parts__ 25

After the application of the solution to the interior surfaces of the container, the coating is allowed to dry at room temperature until it loses the tackiness or stickiness to the touch. This does not mean that the film will be completely dry. It will still contain some of the solvent. Ordinarily the partial drying operation will require about five minutes. The film is then exposed for about five minutes to steam at atmospheric pressure, that is, preferably, steam at a temperature of or somewhat below 212° F. Apparently this treatment will remove substantially all of the residual solvent from the film. Some water of condensation is deposited on the films. Just what action takes place is not certain but the result is a radical change in the character of the film, whereby it becomes much more highly resistant to water, alcohol and other liquids, than an air dried zein film.

*Example 2*

The solvent mixture in this case is composed as follows:

| | |
|---|---|
| Zein _____ parts by weight __ | 100 |
| 95% ethyl alcohol _____ parts __ | 350 |
| Dibutyl tartrate (plasticizer) _____ do ____ | 20 |
| 40% aqueous formaldehyde _____ do ____ | 5 |

The film produced from this solution is treated as in Example 1. The formaldehyde gives the film additional toughness and hardness.

It is preferable to allow the film to dry to the extent indicated before applying the steam, as earlier application of the steam is apt to bring about the boiling or ebullition of the residual solvent in the film with consequent impairment of the integrity or appearance of the film.

This application is a substitute for and is a continuation in part of, copending U. S. application of Oswald C. H. Sturken, filed August 23, 1937, Serial No. 160,478.

I claim:

1. Process of treating a zein body to give it resistance to water and other liquids which consists in bringing said body containing a zein solvent into contact with steam.

2. Process of treating a zein body to give it resistance to water and other liquids which consists in bringing said body containing an alcoholic solvent of zein into contact with steam.

3. Process of treating a zein body to give it resistance to water and other liquids which consists in bringing said body containing an alcoholic solvent selected from the group consisting of methyl alcohol, aqueous ethyl alcohol and aqueous isopropyl alcohol, into contact with steam.

4. Process of treating a zein film containing a zein solvent to give the film resistance to water and other liquids which consists in bringing steam into contact with said film at substantially atmospheric pressure.

5. A water-proof zein body consisting of the reaction product of zein in the presence of a zein solvent, water and heat.

6. A water-proof zein film consisting of the reaction product of zein in the presence of a zein solvent, water and heat.

7. Process for the production of a water-proof zein film which comprises: dissolving zein in an alcoholic solvent; partially drying out the solvent; and then subjecting the partially dried film to steam at substantially atmospheric pressure for about five minutes to bring about a reaction which makes the film resistant to water and other liquids.

OSWALD C. H. STURKEN.